(12) United States Patent
Morii

(10) Patent No.: US 6,424,394 B1
(45) Date of Patent: Jul. 23, 2002

(54) LIQUID CRYSTAL DISPLAY DEVICE HAVING GRID-SHAPED LIGHT SHIELDING FILMS IN PERIPHERAL REGION

(75) Inventor: Yasuhiro Morii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/257,194

(22) Filed: Feb. 25, 1999

(30) Foreign Application Priority Data

Jul. 13, 1998  (JP) .......................................... 10-197199

(51) Int. Cl.⁷ .......................................... G02F 1/1333
(52) U.S. Cl. ........................................ 349/110; 349/153
(58) Field of Search ................................ 349/110, 111, 349/156, 153

(56) References Cited

U.S. PATENT DOCUMENTS 5,739,882 A * 4/1998 Shimizu et al. ............ 349/123
5,822,028 A * 10/1998 Miyawaki ................... 349/111
5,905,553 A    5/1999 Matsukawa et al.

FOREIGN PATENT DOCUMENTS

JP            9-90383        4/1997

* cited by examiner

*Primary Examiner*—Kenneth Parker
(74) *Attorney, Agent, or Firm*—Oblon, Spivak, McClelland, Maier & Neustadt, P.C.

(57) ABSTRACT

In a liquid crystal displaying device where the aperture ratio is made higher by using a photocuring adhesive sealant for adhering two substrates, and the contraction of tact time is achieved, a liquid crystal displaying device which is free from inferior curing of the adhesive sealant and is high in reliability can be obtained. In two substrates for forming a liquid crystal displaying device, where the substrates have at least one layer of light shielding film, the inferior curing of the photocuring adhesive sealant can be removed by limiting the width of the light shielding film existing above or under the adhesive sealant which glues the two substrates. As this result, a liquid crystal displaying device which is high in aperture ratio and high in reliability can be obtained.

5 Claims, 8 Drawing Sheets

LIQUID CRYSTAL DISPLAY DEVICE HAVING GRID-SHAPED LIGHT SHIELDING FILMS IN PERIPHERAL REGION

BACKGROUND OF THE INVENTION

The present invention relates to the construction of a liquid crystal displaying device where two substrates (TFT substrate and counter substrate) are adhered with an adhesive sealant in the periphery thereof and a liquid crystal is interposed between these two substrates, and more particularly, to a liquid crystal displaying device where the photocuring adhesive sealant is applied, the positioning margin is designed to be smaller, and an aperture ratio is improved.

The liquid crystal displaying device is used in a wider field including the alternation of the CRT. Especially, carrying terminals such as note-book type PCs or systemized electronic note-books have been remarkably spread in recent years. When the liquid crystal displaying devices are used for the above described usages, lower power consumption is required. To achieve the lower power consumption, the aperture ratio of the liquid crystal displaying device is expected to be improved.

The normal thermosetting adhesive sealants have been used for many liquid crystal displaying devices, because they are superior to the other adhesive sealants in terms of moisture resisting property and bonding strength. But when the temperature differences are caused between the two opposing substrates (counter substrates), the positional deviation is caused due to the thermal expansion of the glass substrate, because heating is used for curing the sealant. To cope with the positional deviation, the margin of the positional deviation is adopted in pixel designing of the current liquid crystal displaying device. This design margin reduces the aperture ratio (ratio of the active area to the total area of the liquid crystal panel. The application of the photocuring adhesive sealant is becoming attractive as an art of reducing the design margin and manufacturing the liquid crystal displaying device high in aperture ratio. By the application of the photocuring adhesive sealant, the positional deviation margin can be designed to approximately one third, achieving the higher aperture ratio of the liquid crystal displaying devices.

However, any consideration of irradiating the light to the adhesive sealant is not adopted for the designing of the conventional liquid crystal displaying devices. When the photocuring adhesive sealant is used for the conventional liquid crystal displaying device using the thermosetting adhesive sealant, the inferior curing of the sealant is caused in a portion where the light is not irradiated. The photocuring adhesive sealant of non-curing is melted as and impurity in the liquid, thus resulting in inferior displaying. When the sealant is non-curing, the function as the bonding agent is not effective so that the two substrates cannot be adhered.

Thus, the design reference of the liquid crystal displaying device for using the photocuring adhesive sealant is required.

In the structure of the conventional liquid crystal displaying device using such a thermosetting adhesive sealant as described above, the inferior curing is caused when the photocuring adhesive sealant is used, because the use of photocuring adhesive sealant is not considered in the designed thereof, thus being unable to use for practical application. Although Japanese Unexamined Patent Publication No. 127174/1993, Japanese Unexamined Patent Publication No. 112128/1986, Japanese Unexamined Patent Publication No. 211396/1996, Japanese Unexamined Patent Publication No. 219932/1986, Japanese Unexamined Patent Publication No. 076930/1994, Japanese Unexamined Patent Publication No. 101395/1996, Japanese Unexamined Patent. Publication No. 146436/1996, and Japanese Unexamined Patent Publication No. 093421/1984 are used in the prior art where the photocuring adhesive sealant is used for the liquid crystal displaying device, the detailed description is not provided for the designing standard of the light shielding film where the adhesive sealant of the electrode substrate is positioned., In the present invention, the light necessary for curing the photocuring adhesive sealant can be applied sufficiently by slitting in the light shielding film where the photocuring adhesive sealant is positioned on the electrode substrate. Thus, a liquid crystal displaying device which can be prevented from the inferior curing of the photocuring adhesive sealant, and high in aperture ratio and high in reliability is obtained.

SUMMARY OF THE INVENTION

A first object of the present invention is to provide the structure of a novel liquid crystal displaying device for application of the photocuring adhesive sealant in a liquid crystal displaying device using the light shielding film.

The width of the light shielding film which exists above or under the photocuring adhesive sealant interposed by the electrode substrates is required to be 150 μm or less.

The shape of the light shielding film existing above or under the photocuring adhesive sealant interposed by the substrates is required to be grid-shaped so as to transmit the light from the back face direction of the substrate (the reverse side of the film face).

The grid shape is required to be 150 μm or lower in light shielding width and 5 μm or more in the aperture width.

The shape of the light shielding film on the two substrates is grid-shaped designed to transmit the light from the back face side of the substrate (the reverse side of the film face), and the positional relation of the two opposing substrates is required to be 150 μm or less in the superposing width (11 in FIG. 3) between the light shielding film portion of one of the two substrates and the light shielding film portion of another substrate.

The photocuring adhesive sealant which can be used in the present invention can be widely chosen if it is a material which starts the curing reaction by the light. Acrylate resin which can be used in the normal liquid crystal displaying device and resin or the like which uses photo cationic reaction can be used. Not only a material which cures only by the light, but a material which also has thermosetting property can be used.

Figure 4:
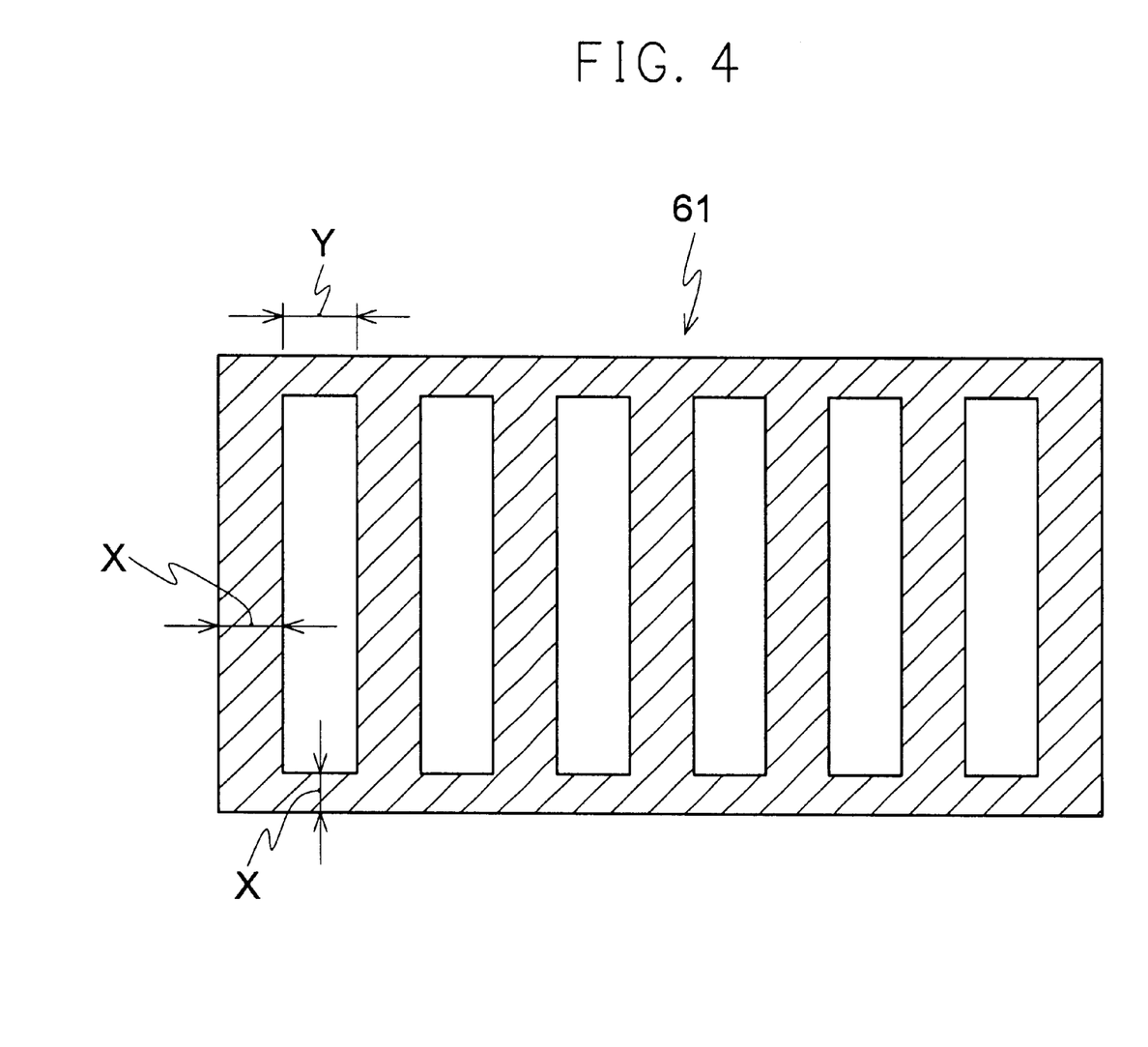
FIG. 4 is an explanatory view showing a shape of an example of a light shielding film proposed in the present invention.
Figure 5:
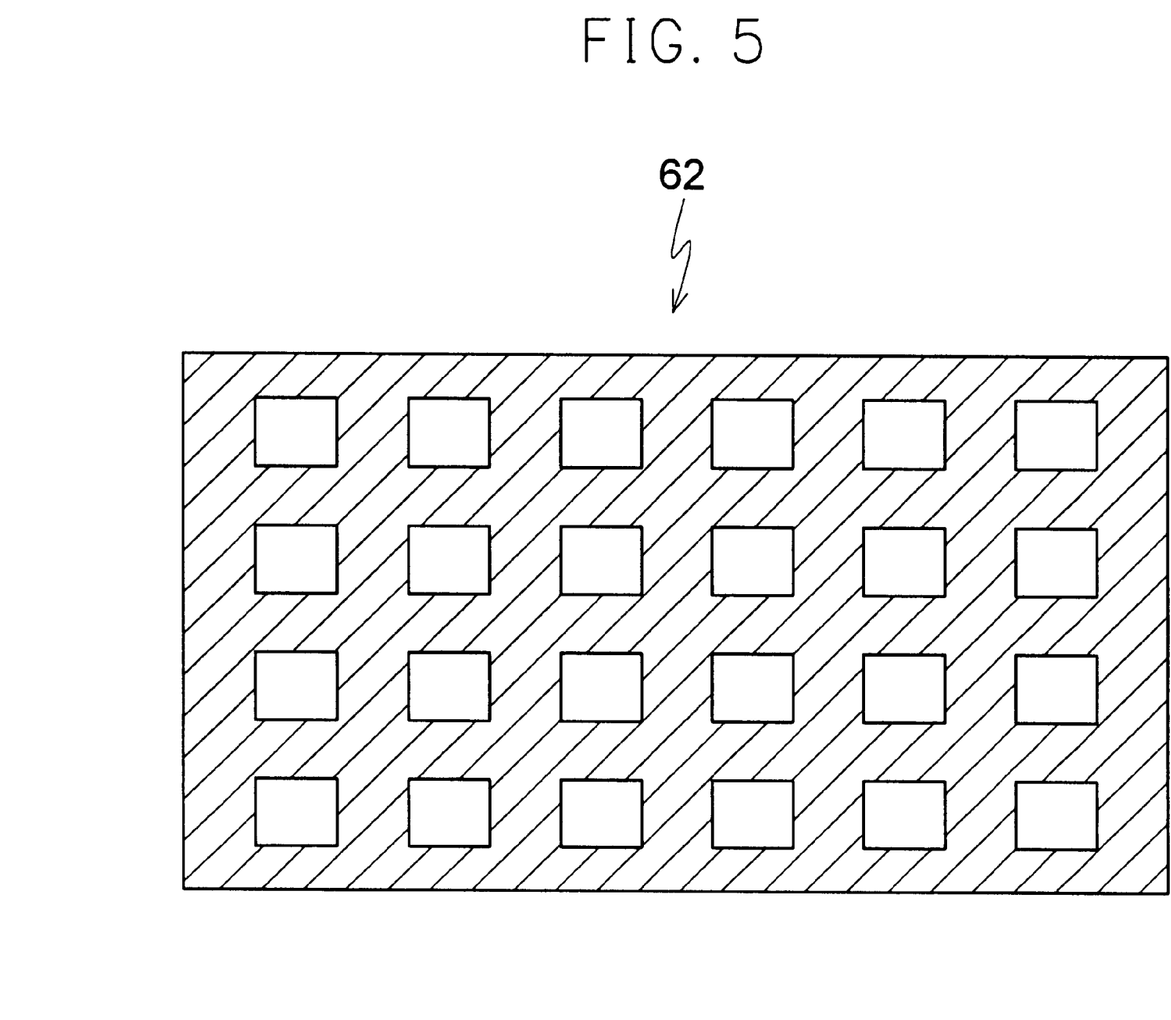
FIG. 5 is an explanatory view showing a shape of another example of a light shielding film proposed in the present invention.
Figure 6:
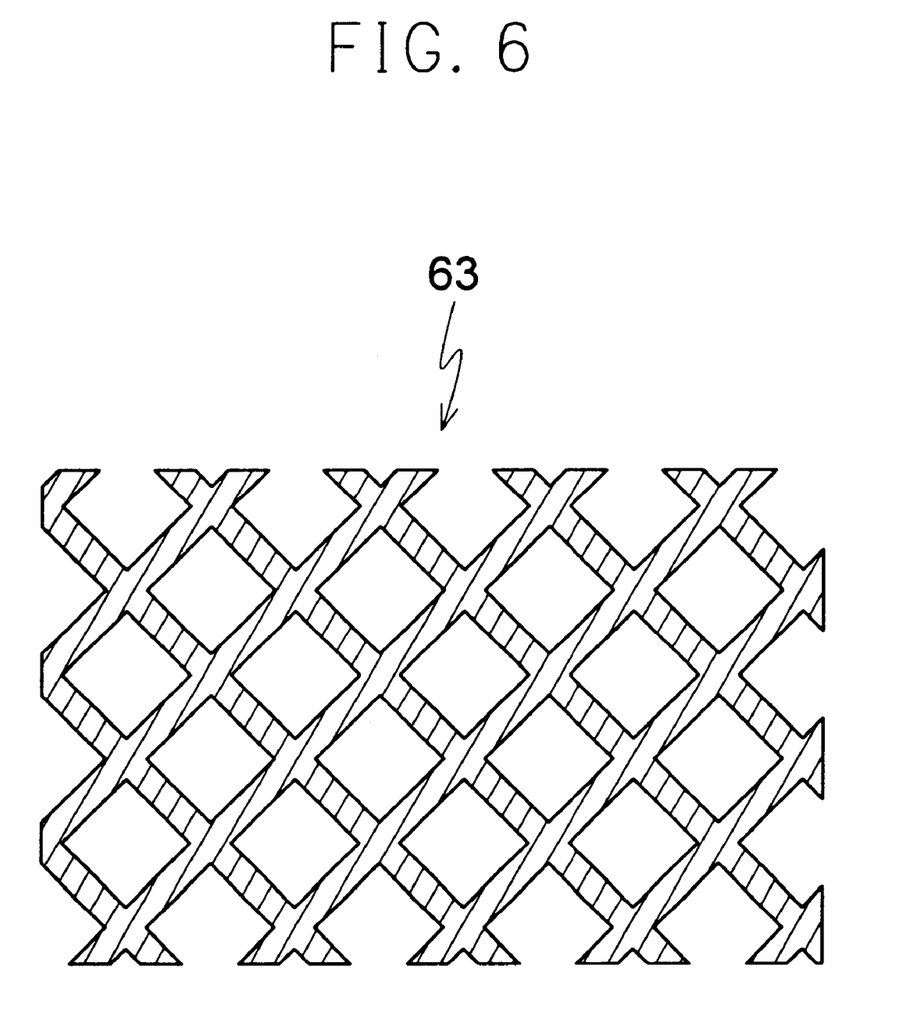
FIG. 6 is an explanatory view showing a shape of still another example of a liquid crystal displaying device proposed in the present invention.

Grid-shaped pattern examples which can be used in the present invention are shown in FIGS. 4, 5 and 6. The light shielding film portion, i.e., a light shielding portion in a grid-shaped pattern is shown with hatching, and the aperture portion, i.e, a portion for transmitting the light is shown with white painting. The shape of the white painting portion is not limited in the above although circle, ellipse or the like can be used in addition. Three types of square patterns 61, 62 and 63 are shown for illustration, and the pattern of FIG. 4 is used for detailed description. The width of the light shielding film to be defined in the present invention is denoted by X, and the aperture width is denoted by Y, wherein the width of the light shielding portion is X and the width of the aperture portion is Y in the figure.

The type of liquid crystal materials which can be used in the present invention is not limited. A liquid crystal material or the like can be used which is used for the normal TN type liquid crystal displaying device.

Normal glass, quartz or the like, and a substrate material which is used in the conventional liquid crystal displaying device can be used in the substrate material of the present invention. A metallic film of Al, Cr or the like and a multi-layer film of them, if these materials does not transmit light, can be used for the light shielding film material of the present invention.

The function of the present invention will be described using FIGS. 7 and 8. Reference numeral 101 is light, reference numeral 102 is an electrode substrate functioning as a substrate recited, reference numeral 103 is a light shielding film of 100 μm width, reference numeral 104 is a light shielding film, reference numeral 105 is an electrode substrate functioning as a substrate, reference numeral 106 is a photocuring adhesive sealant, reference numeral 107 is a light shielding film of 800 μm width, reference numeral 108 is a photocuring adhesive sealant, reference numeral 109 is a region, reference numeral 110 is an electrode substrate, and reference numeral 111 is a light passing through a photocuring adhesive sealant 106.

Figure 7:
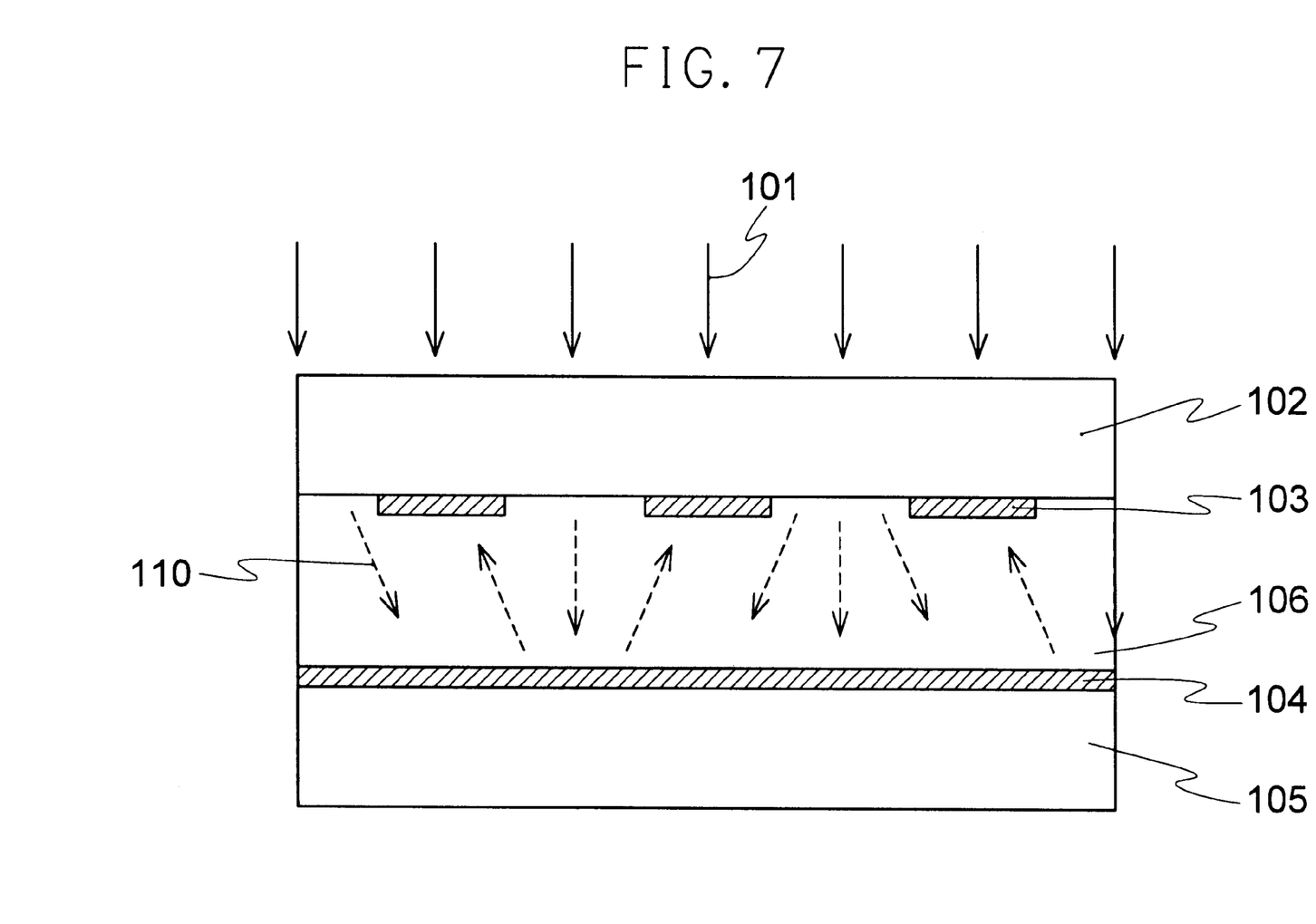
FIG. 7 is an explanatory view showing a function achieved by the present invention.

FIG. 7 shows a curing condition of a photocuring adhesive sealant 106 placed between the electrode substrate 102 where the light shielding film 103 of 100 μm width is formed and an electrode substrate 105 where the light shielding film 104 is formed. The photocuring adhesive sealant 106 is completely cured with refractions of light 101 in the electrode substrate 102 and light 111 through reflection by the light shielding film 104.

Figure 8:
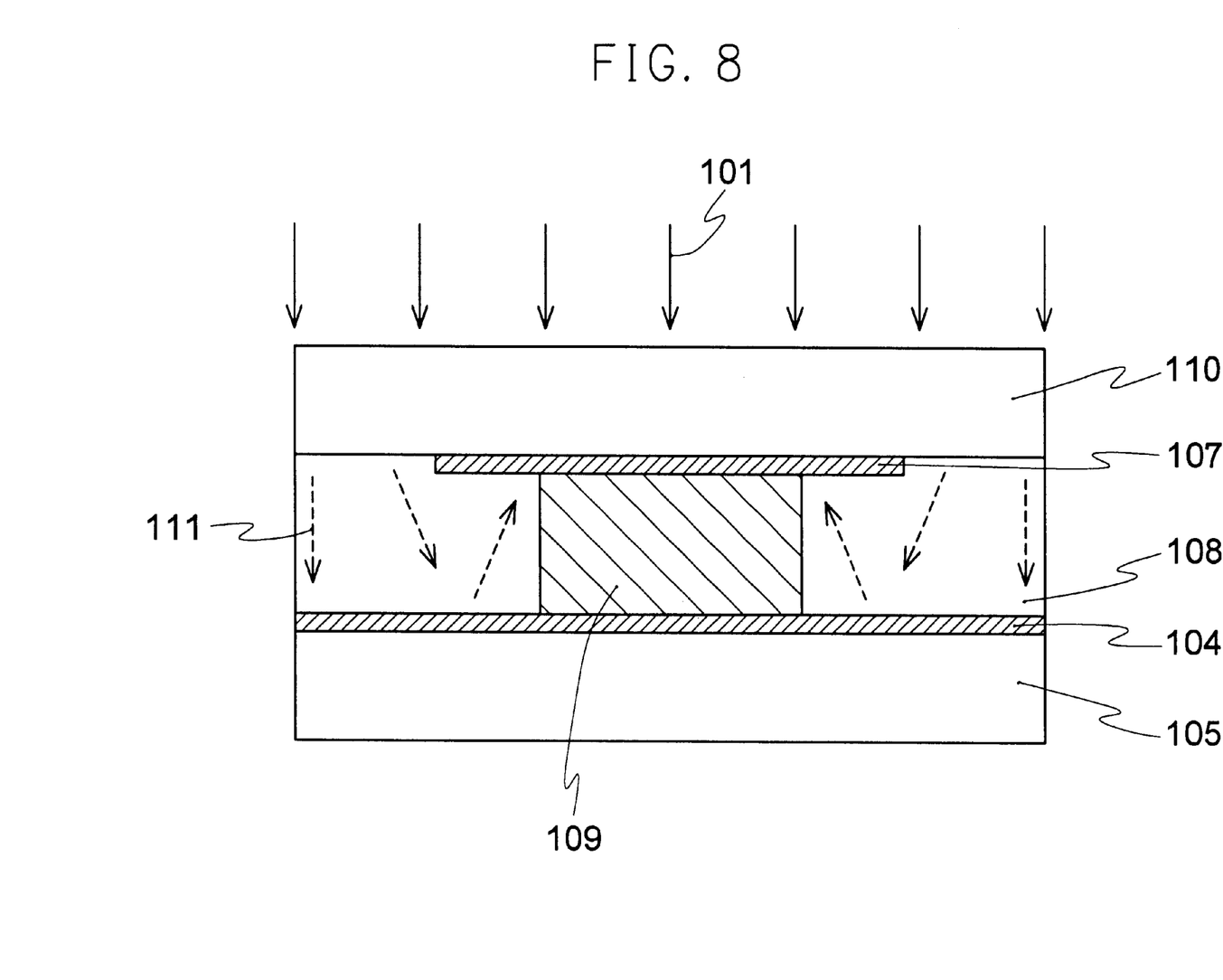
FIG. 8 is an explanatory view showing a function achieved by the present invention.

FIG. 8 shows a curing condition of a photocuring adhesive sealant 108 placed between the electrode substrate 110 where the light shielding film 107 of 800 μm width is formed and the electrode substrate 105 where the light shielding film 104 is formed.

Although the photocuring adhesive sealant in the lower portion of a light shielding film 107 of 800 μm width is partially cured by the refractions or reflections of the light 101 as described above, it is not cured in the region 109. By examination, the width of the region 109 where the photocuring adhesive sealant is not cured is 650 μm in this case. Namely, the curing depth of the light shielding depth is 75 μm and the width of the light shielding film is required to be 150 μm or less.

Lines and spaces (L/S) are formed on In constant period a glass substrate generally used in the TFT—LCD, a UV adhesive sealant is coated on the upper portion of the substrate and the adhesive sealant is squeezed to a thickness of 6 μm with another glass substrate (with no pattern) of the same material as described above. Then, the UV light is irradiated from the reverse face side of the pattern and the adhesive sealant is cured. After the curing of adhesive sealant, the glass substrate is peeled away to measure the curing degree of the cured adhesive sealant. An analysis method used is the Fr—IR. The results are shown in Table 1.

TABLE 1

| Combination of L/S (μm) | Decision of Curing Degree |
| --- | --- |
| 100/100 | ◯ |
| 150/150 | ◯ |
| 160/160 | X |
| 200/200 | X |
| 160/150 | X |
| 150/50 | ◯ |
| 150/30 | ◯ |
| 150/10 | ◯ |
| 150/5 | ◯ |
| 150/3 | X |

Remark: "◯" represents good, "X" represents no good.

To sufficiently obtain the optical energies in the adhesive sealant for curing, the width of the aperture of the light shielding film is required to be 5 μm or more.

To cure the photocuring adhesive sealant under the light shielding film, it is required to have 150 μm or less in the width X of the light shielding film and 5 μm or more in the width Y of the aperture.

Thus, a liquid crystal displaying device can be obtained which can prevent the photocuring adhesive sealant under the light shielding film from being inferior in curing, and is high in aperture ratio and high in reliability.

DETAILED DESCRIPTION

The present invention will now be explained by examples of embodiments thereof and with reference to the accompanying drawings.

EMBODIMENT 1

Figure 1:
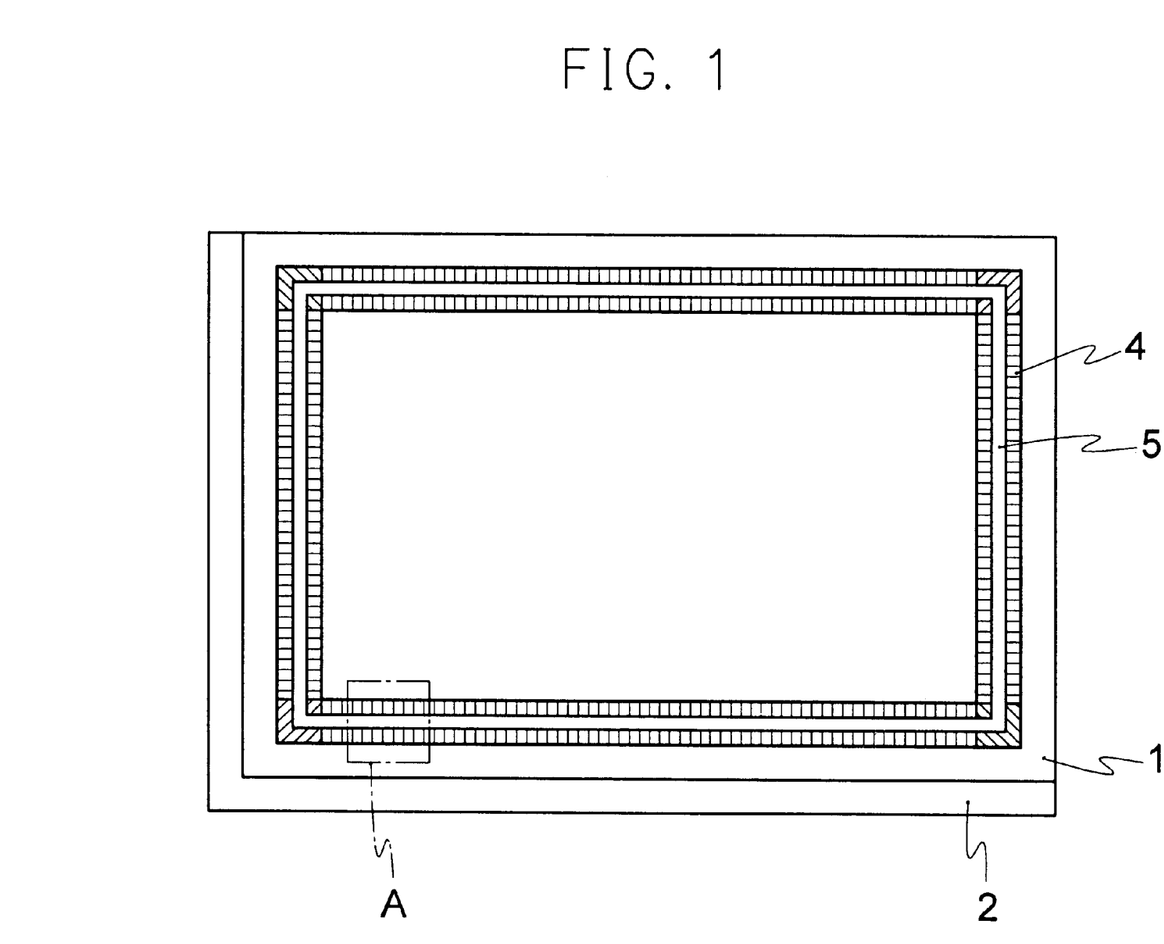
FIG. 1 is an explanatory view showing a liquid crystal displaying device of one embodiment of the present invention.
Figure 2:
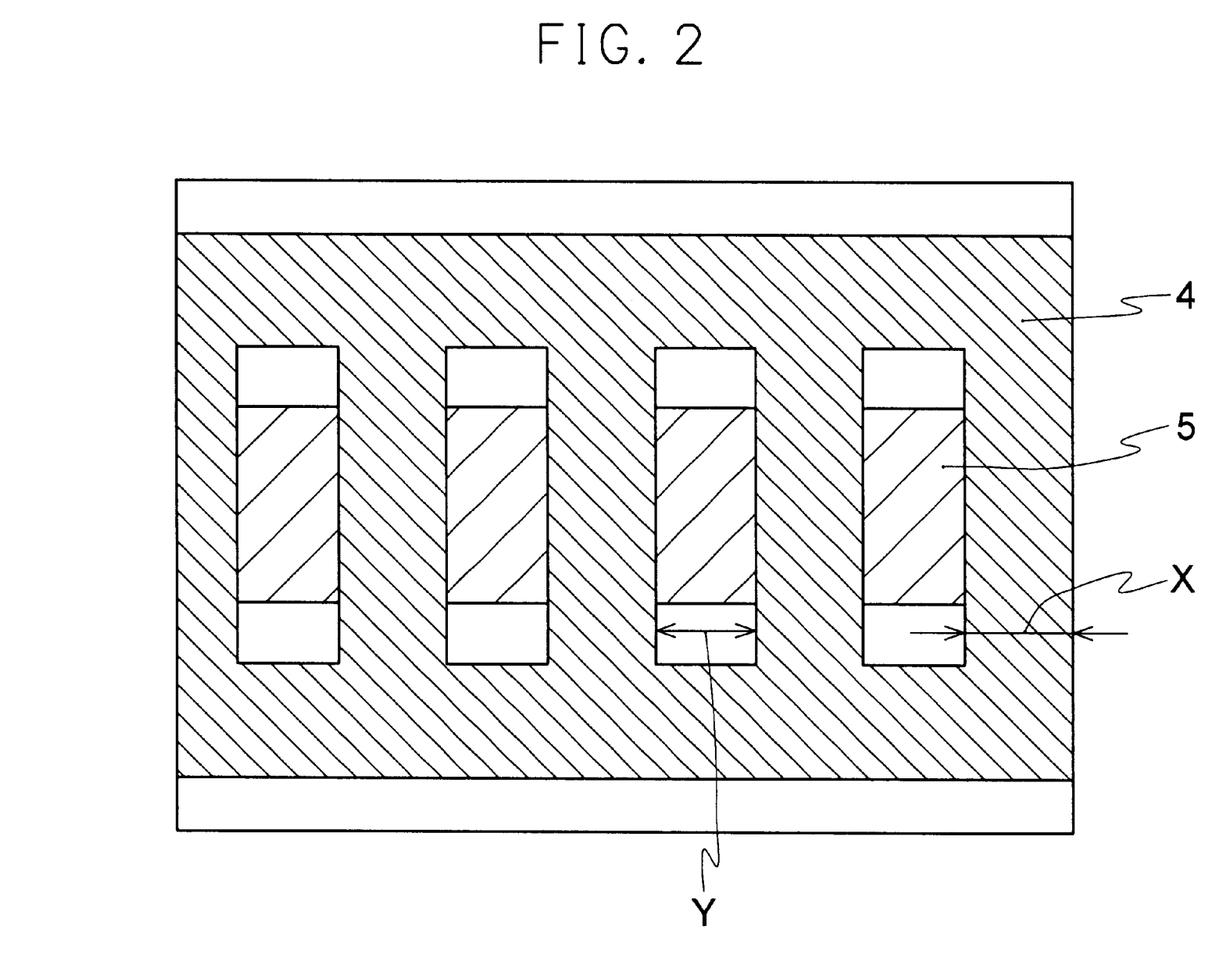
FIG. 2 is an explanatory view showing a liquid crystal displaying device of another embodiment of the present invention.

EMBODIMENT 1 of the present invention will be described hereinafter. FIG. 1 shows a liquid crystal displaying device manufactured by EMBODIMENT 1 of the present invention. FIG. 2 shows a model view of a light shielding film with the liquid crystal displaying device shown in FIG. 1 as a region A.

A liquid crystal displaying device is manufactured by using an electrode substrate 1 of the present invention for forming a grid-shaped pattern 4 shown in FIG. 2, and an electrode substrate 2 to be used for the conventional liquid crystal displaying device. Comparison between the liquid crystal displaying device of the present invention and the conventional one shows that an adhesive sealant for adhering two substrates is a photocuring adhesive sealant 5 and the light shielding film has a grid-shaped pattern 4.

The grid-shaped pattern 4 in this embodiment has 80 μm in the width X of the light shielding portion and 80 μm in the width Y of the aperture portion.

The photocuring adhesive sealant 5 is formed on the electrode substrate 1 by a dispenser process. After superpositioning the electrode substrate 1 and the electrode substrate 2, the light irradiation was conducted from the direction of the electrode substrate 1 to conduct a seal curing operation.

The photocuring adhesive sealant 5 used in this embodiment is acrelate resin which shows photo radical reaction. The conditions of the light irradiation is 365 nm in wave length, 100 mW/cm$^2$ in intensity and 30 seconds in irradiation time, by using a metal haride lamp of 4 kW output.

In this embodiment, an alignment film related process, a spacer-related process, a cutting process, pouring process and so on, except for the sealing process, are conducted by a conventional process.

A liquid crystal displaying device manufactured as described above has a high aperture ratio because the positional deviation margin for compensating the positional deviation caused due to the adhesive sealant curing can be made approximately one third of the conventional one, and a high reliability because inferior curing of the photocuring type adhesive sealant 5 is not caused. The light using efficiency is increased by the high aperture ratio. For a certain brightness required, the brilliance of the back light can be reduced when the aperture ratio is higher, whereby the consumption power can be reduced.

COMPARATIVE EXAMPLE 1

A liquid crystal displaying apparatus is manufactured by the same material and step as those of EMBODIMENT 1. But in this comparative example, 200 μm in width X of the light shielding film of the grid-shaped pattern, and 200 μm in the width Y of the aperture portion are used for the electrode substrate 1. The light irradiation is conducted from the direction of the electrode substrate 1. As this result, an inferior curing is caused in the adhesive sealant, whereby the reliability can not be retained.

COMPARATIVE EXAMPLE 2

A liquid crystal displaying apparatus is manufactured by the same material and step as those of EMBODIMENT 1. But in this comparative example, the conventional electrode substrate without grid-shaped pattern is used for the electrode substrate 1. The light irradiation is conducted from both the faces of the substrate. As this result, an inferior curing of the adhesive sealant is caused, whereby the reliability cannot be retained.

COMPARATIVE EXAMPLE 3

A liquid crystal displaying apparatus is manufactured by the same material and step as those of EMBODIMENT 1. But in this comparative example, 200 μm in width X of the light shielding film of the grid-shaped pattern, and 3 μm in the width Y of the aperture portion are used for the electrode substrate 1. The light irradiation is conducted from direction side of the electrode substrate 1. As this result, an inferior curing is caused in the adhesive sealant, whereby the reliability cannot be retained.

EMBODIMENT 2

Figure 3:
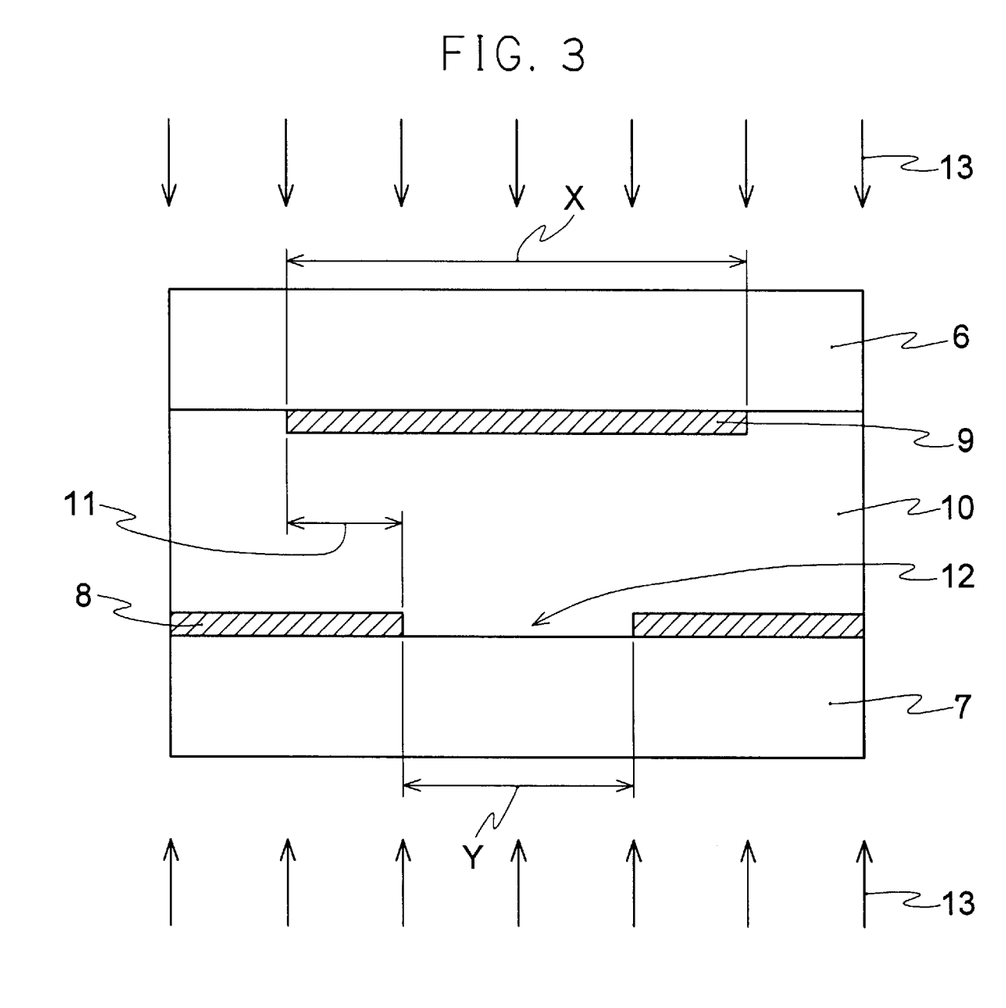
FIG. 3 is a partially sectioned explanatory view showing a liquid crystal displaying device of FIG. 2.

A second embodiment of the present invention is illustrated. FIG. 3 shows a partial sectional view of this embodiment of present invention.

As the liquid crystal displaying device to be illustrated in this embodiment has a special feature compared with that shown m this EMBODIMENT 1, as the feature is seen above and under the electrode substrate where a seal is positioned, this portion is illustrated. As the other construction and material are the same as those of EMBODIMENT 1, the description thereof is omitted.

A photocuring adhesive sealant 10 is formed on the electrode substrate 6 by a dispenser process. After superposing the electrode substrate 6 and the electrode substrate 7, the light 13 is irradiated from both the sides of the electrode substrate 6 and the electrode substrate 7 to make it panel.

The width X of the light shielding film 8 and the light shielding film 9 shown in this embodiment is 800 μm, and the width Y of the aperture portion 12 is 500 μm.

The positional relationship after superposing the electrode substrate 6 and the electrode substrate 7 in this embodiment is 150 μm 11 in the overlap amount between the light shielding film 9 on the electrode substrate 6 and the light shielding film 8 on the electrode substrate 7.

In the liquid crystal displaying device, a uniform alignment condition can be provided without causing the alignment disorder of the liquid crystal near the photocuring adhesive sealant 10.

It is confirmed that a liquid crystal displaying device manufactured as described above is free from defects on the displaying due to the adhesive sealant.

In the liquid crystal displaying device above, the inferior curing of the photocuring adhesive sealant 10 is not caused.

The liquid crystal displaying device manufactured as described above is high in aperture ratio and high in reliability. The high aperture ratio increases the using efficiency of the light. For a certain brightness required, the brilliance of the back light can be reduced when the aperture ratio is higher, thereby reducing the power consumption.

Table 2 shows the structure and effects in the embodiments so far described.

As for the embodiments described above, both two substrates of the crystal displaying device were assumed to have each electrode. However, the present invention is applicable to the case in which only one substrate of the two have the electrode, and results in the same effects.

In addition, at least a part of the light shielding film is usually used as a route of the wiring for displaying matrix electrode.

TABLE 2

| | grid-shaped film provided above and under sealing member | width of light shielding film ($\mu$m) | width of aperture ($\mu$m) | the direction of light irradiation | curing state of adhesive sealant |
|---|---|---|---|---|---|
| EMBODIMENT 1 | single side substrate | 80 | 80 | one surface | good |
| EMBODIMENT 2 | double side substrate | 800 | 500 | both surfaces | good |
| COMPARATIVE EXAMPLE 1 | single side substrate | 200 | 200 | one surface | badly cured |
| COMPARATIVE EXAMPLE 2 | nothing | — | — | both surfaces | badly cured |
| COMPARATIVE EXAMPLE 3 | single side substrate | 200 | 3 | one surface | badly cured |

As the present invention is constructed as described above, the following effects as described below are achieved.

The present invention is a liquid crystal displaying device interposing a liquid crystal material between two substrates, each having at least one layer of light shielding film at least one of said two substrates being provided with an electrode. The liquid crystal displaying device manufactured by adhering so that the respective substrates are oppositely arranged with the photocuring adhesive sealant therebetween, being irradiated with light upon the photocuring adhesive sealant. Since the width of the light shielding film existing above or below the photocuring adhesive sealant interposed by said two substrates is 150 $\mu$m or less, the inferior curing of the photocuring adhesive sealant is prevented. Thus, a liquid crystal displaying device of high reliability can be obtained.

The shape of the light curing film existing above or below the photocuring adhesive sealant interposed by said two electrode substrates is made grid-shaped to improve the inferior curing of the photocuring adhesive sealant, whereby a liquid crystal displaying device of high reliability can be obtained.

Since the grid shape of the light shielding film in a portion where the photocuring adhesive sealant is arranged is made 150 $\mu$m or less in light shielding width and 5 $\mu$m or more in aperture width, the inferior curing of the photocuring adhesive sealant is removed, whereby a liquid crystal displaying device of high reliability can be obtained.

In a liquid crystal displaying device interposing a liquid crystal material between two substrates each having at least one layer of light shielding film, at least one of said two substrates being provided with an electrode, wherein the liquid crystal displaying device is manufactured by gluing so that the said two substrates are oppositely arranged with the photocuring adhesive sealant therebetween, being irradiated with light upon the photocuring adhesive sealant, the light shielding film of a portion where the photocuring adhesive sealant is placed on said two substrates is grid-shaped and the superposing amount between the grid-shaped light shielding portion on one of the substrates and the light shielding portion on another substrate is 150 $\mu$m or less to improve the inferior curing of the photocuring adhesive sealant. Thus, a liquid crystal displaying device of high reliability can be obtained.

What is claimed is:

1. A liquid crystal displaying device interposing a liquid crystal material between first and second substrates each having at least one layer of light shielding film running around a peripheral portion of the liquid crystal displaying device, at least one of said first and second substrates being provided with an electrode, wherein the liquid crystal displaying device is manufactured by adhering so that said first and second substrates are oppositely arranged with the photocuring adhesive sealant therebetween, being irradiated with light upon the photocuring adhesive sealant, and overlap between the light shielding film on the first substrate and the light shielding film on the second substrate, the amount of the overlap is 150 $\mu$m or less.

2. The liquid crystal displaying device of claim 1, wherein the shape of the light shielding film existing above or below the photocuring adhesive sealant is made grid-shaped.

3. The liquid crystal displaying device of claim 2, wherein the grid shape of the light shielding film in a portion where the photocuring adhesive sealant is arranged is made 150 $\mu$m or less in light shielding width and 5 $\mu$m or more in aperture width.

4. A liquid crystal displaying device interposing a liquid crystal material between first and second substrates each having at least one layer of light shielding film running around a peripheral portion of the liquid crystal displaying device, at least one of said first and second substrates being provided with an electrode, wherein the liquid crystal displaying device manufactured by gluing so that said first and second substrates are oppositely arranged with the photocuring adhesive sealant therebetween, being irradiated with light upon the photocuring adhesive sealant, the light shielding film of a portion where the photocuring adhesive sealant is placed on said first and second substrates is grid-shaped.

5. The liquid crystal display device of claim 4, wherein an amount of overlap between the grid-shaped light shielding portion on the first substrate and the light shielding portion on the second substrate is 150 $\mu$m or less.

* * * * *